UNITED STATES PATENT OFFICE.

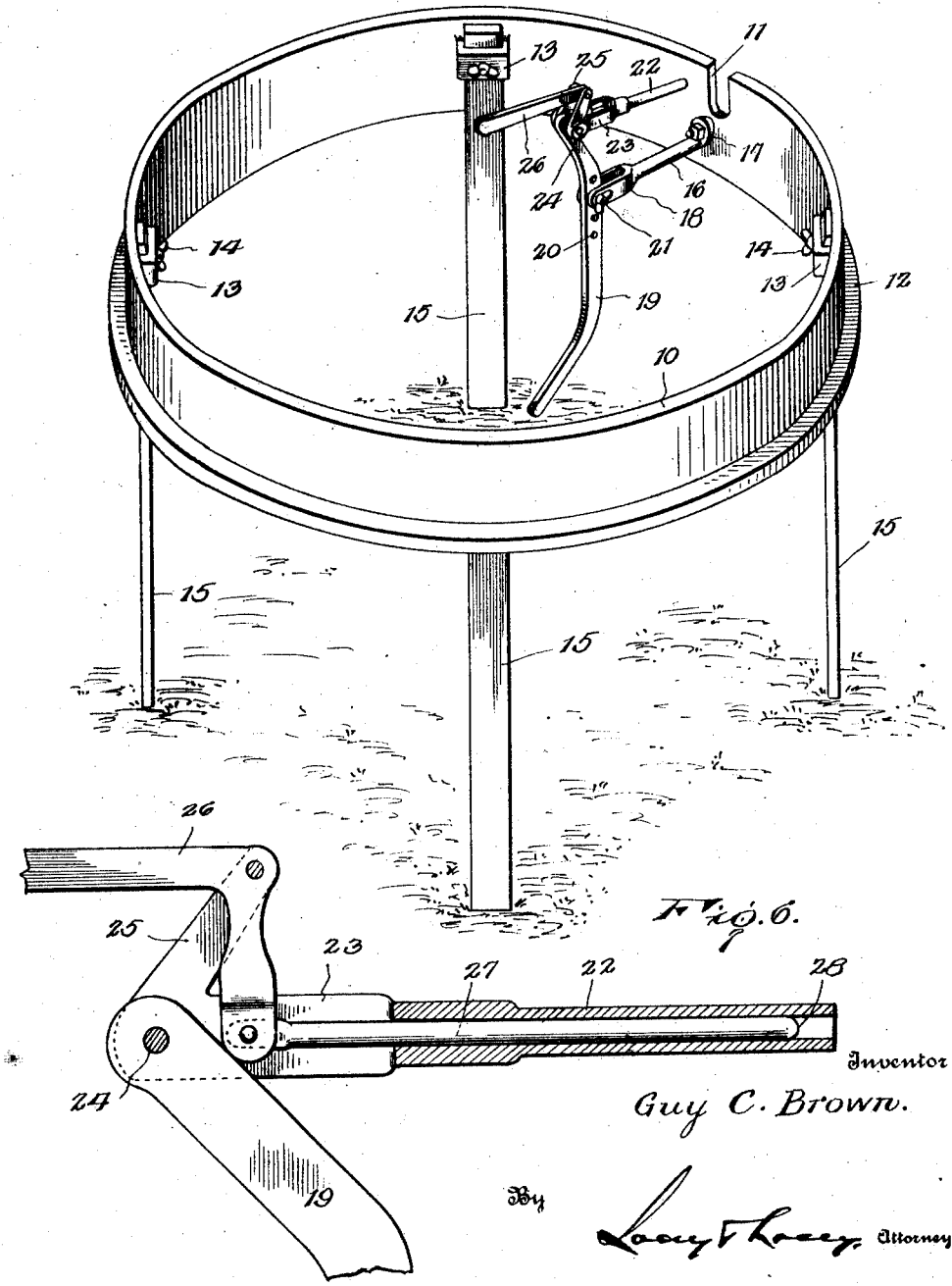

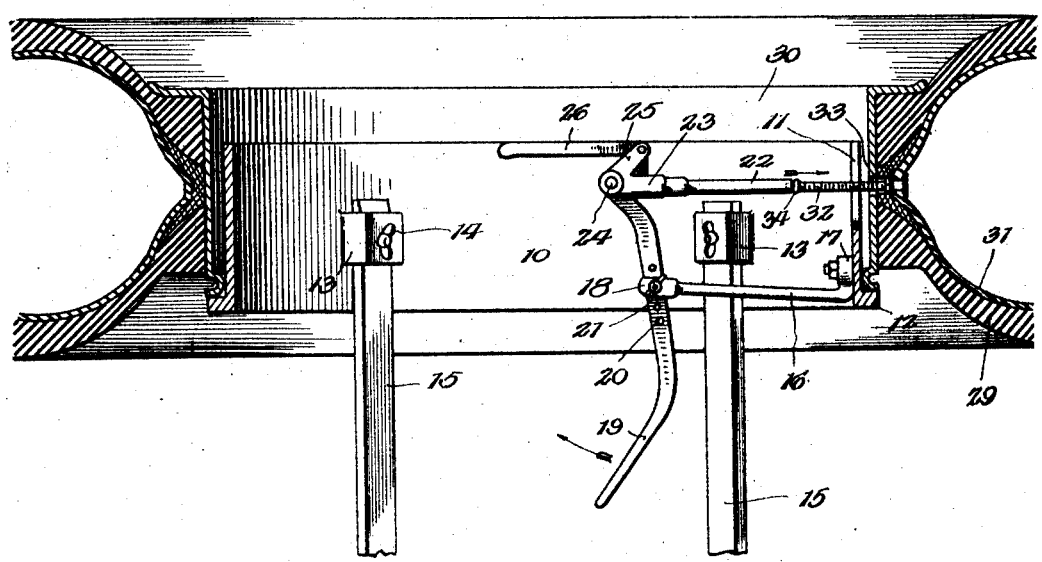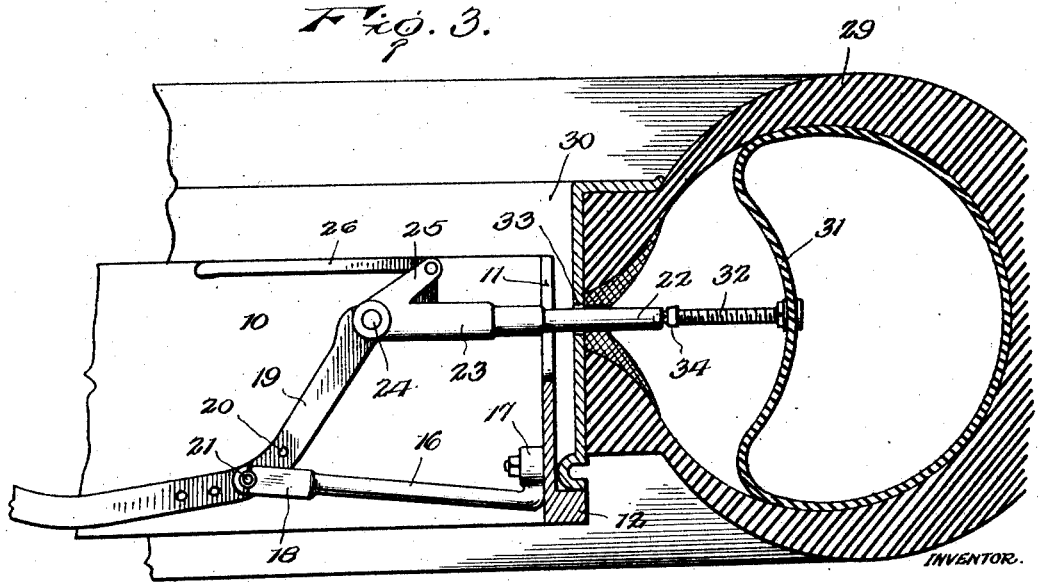

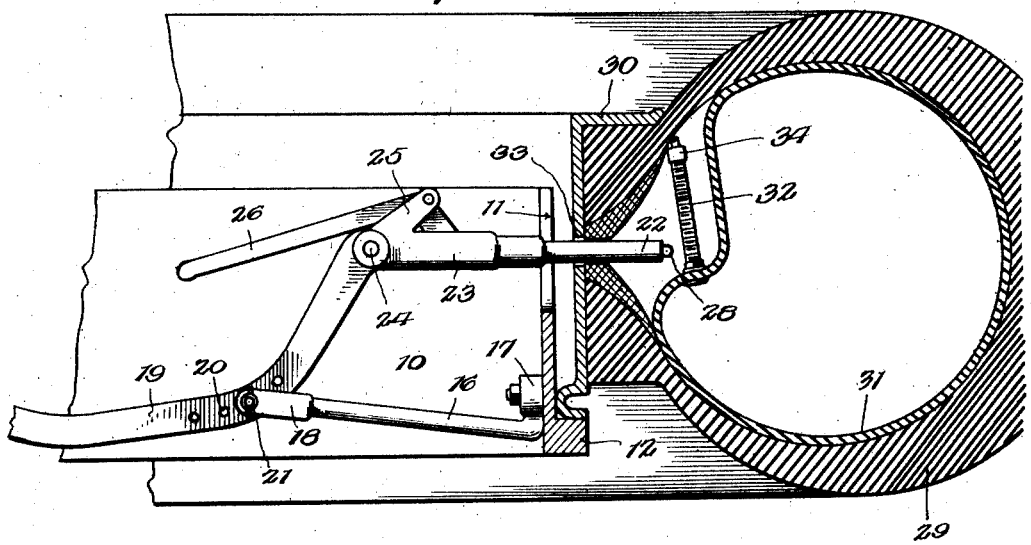
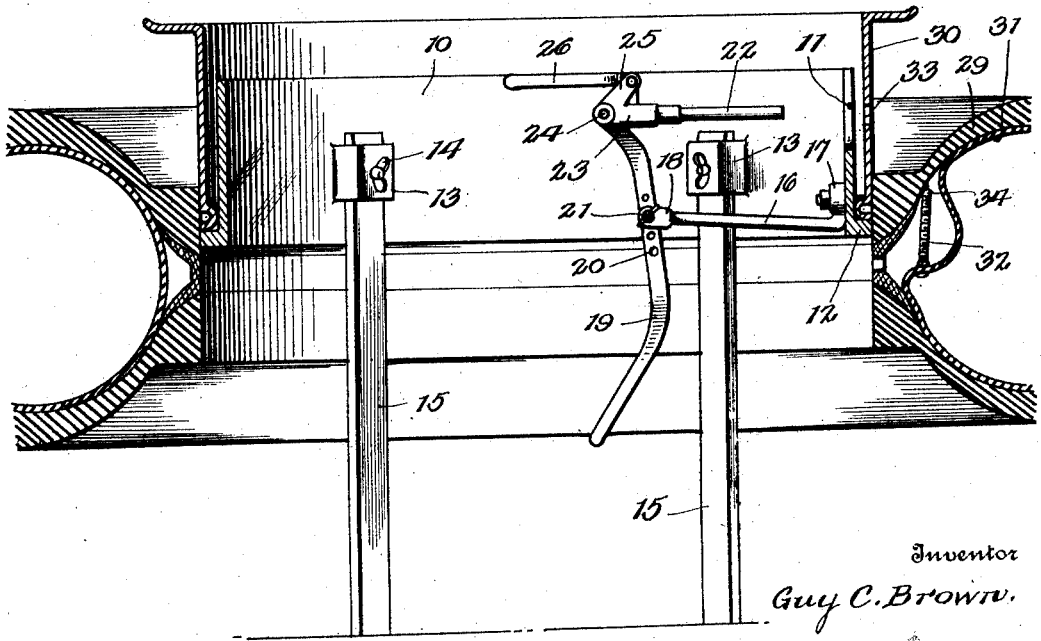

GUY C. BROWN, OF WACO, TEXAS.

PNEUMATIC TRUCK TIRE CHANGING DEVICE.

1,415,865.  Specification of Letters Patent.  Patented May 16, 1922.

Application filed October 2, 1920. Serial No. 414,186.

*To all whom it may concern:*

Be it known that I, GUY C. BROWN, citizen of the United States, residing at Waco, in the county of McLennan and State of Texas, have invented certain new and useful Improvements in Pneumatic Truck Tire Changing Devices, of which the following is a specification.

This invention relates to an improved pneumatic truck tire changing device and has as one of its principal objects to provide a device of this character whereby the heavy, stiff and unwieldy tires of motor trucks may be readily removed.

A further object of the invention is to provide a device for supporting an assembled tire and rim clear of the ground in such position that after the tire has been freed, said tire may simply be pushed downwardly from around the rim.

A still further object of the invention is to provide a device wherein the tire supporting means employed will be equipped with an ejector for pushing the casing of the valve of the tube inwardly through the rim so that this operation may first be readily accomplished for permitting subsequent disengagement of the tire from around the rim.

The invention has as a further object to provide a device wherein the ejector will be equipped with means for disengaging the valve casing therefrom so that after the casing has been pushed inwardly into the tire, the free end of the casing may be caused to lodge against a side of the tire and thus prevented from following the ejector back through the valve opening in the rim when the ejector is retracted.

And the invention has as a still further object to provide a device wherein the ejector may be adjusted for operating against the valve casings of different sized tires.

Other and incidental objects will appear hereinafter.

In the drawings:

Figure 1 is a perspective view of my improved device.

Figure 2 is a sectional view showing a conventional truck tire and rim in position upon the device, Figure 3 is an enlarged fragmentary section showing the ejector of the device moved to push the valve casing of the inner tube of a tire inwardly into the tire, Figure 4 is a view similar to Figure 3, showing the plunger of the ejector moved to disengage the valve casing from the ejector and dislocate the free end of the casing with respect to the valve opening in the rim, Figure 5 is a sectional view showing the tire partly disengaged from the rim, and Figure 6 is an enlarged sectional view particularly showing the mounting of the plunger of the ejector.

As is well known, extreme difficulty is at present experienced in removing pneumatic truck tires due to the fact that such tires are so very heavy, stiff and unwieldy. When such a tire with its rim is laid upon the ground, it becomes difficult to properly grasp the tire as well as unhandy and laborious to work thereon. Further, one of the greatest difficulties experienced is to accomplish the inward removal of the valve casing through the rim into the tire so that the tire may be later shifted laterally from around the rim. Very often the valve casing at the point where said casing passes through the rim becomes rusted, causing the casing to stick and mud and other foreign matter not infrequently collects about the casing at the rim to render the shifting of the casing inwardly into the tire very troublesome. The present invention, therefore, seeks to overcome these various difficulties so that by the use of the device, a tire may be quickly removed from its rim with ease and facility.

In carrying the invention into effect, I employ a supporting stand which includes an annulus 10 which is formed in its upper margin at one side thereof with a notch 11 while from the lower margin of said annulus projects an outwardly directed radial flange 12. Formed on or otherwise secured to the inner face of the annulus is a plurality of keepers or loops 13 in which are threaded set screws 14. The keepers are equally spaced about the annulus and engaged through said keepers are legs 15 held by said set screws, the legs being preferably tapered in thickness so as to wedge within the keepers.

Mounted upon the stand is a valve casing ejector. This ejector includes a bracket 16 which is arranged to extend radially inward from the annulus beneath the notch 11 therein, being provided at its inner end with a laterally directed eye 17 through which is engaged a bolt or other suitable fastening device securing the bracket to the annulus.

At its outer end the bracket is formed with a yoke 18 and pivoted upon said yoke is a lever 19. As clearly shown in Figure 1, this lever is provided with a series of vertically spaced openings 20 therein and selectively engageable through said openings is a pivot bolt 21 swingingly connecting the lever with the yoke. The lever is formed with a laterally directed upper end portion inclined away from the annulus 10 and pivoted thereon is an ejector barrel 22. This barrel is formed at its inner end with a yoke 23 straddling the upper end of the lever and engaging through the arms of the yoke and through the lever is a pivot pin 24 swingingly connecting the barrel with the lever to normally extend radially outward therefrom toward the annulus 10. Rising from the arms of the yoke at their inner ends is a pair of forwardly inclined lugs 25 and pivoted upon said lugs to swing therebetween is, as particularly shown in Figure 6, a bell crank 26 having a depending short arm and a rearwardly directed long arm. Slidable through the barrel 22 is a plunger 27 pivotally connected at its inner end to the free end portion of the short arm of the bell crank. This plunger is provided at its outer end with a rounded tip 28 and, as will now be readily seen, the bell crank may be rocked for projecting the plunger at the outer end of the barrel or retracting the plunger within the barrel. In this connection it is to be observed that when the plunger is disposed in its normal retracted position, the short arm of the bell crank will contact the laterally inclined upper end portion of the lever 19 at its upper edge for supporting the ejector barrel in substantially horizontal position so that when the upper end portion of the lever is swung forwardly the barrel of the ejector will be projected through the notch 11 of the annulus. Owing to the presence of the series of openings 20 in the lever, said lever may, as will be readily understood, be adjusted vertically upon the bracket 16 for varying the normal height of the ejector with respect to the annulus and since the lever is pivoted near its upper end upon the bracket, the lower end portion of the lever will provide a weight operating to retract the barrel when the lever has been swung so that the barrel of the ejector will normally be held within the annulus spaced therefrom in a position out of the way.

In order to clearly bring out the operation of my improved device and its manner of use I have, in the drawings, shown a conventional pneumatic truck tire and rim in connection therewith. The tire is indicated at 29 and the rim at 30, the rim being shown as having its removable side flange displaced. An ordinary inner tube 31 is shown within the tire casing and, as usual, this inner tube is equipped with a valve having a casing 32 which normally projects freely through a valve opening 33 in the rim and is threaded at its outer end to receive the customary cap 34. To remove the tire from the rim, the detachable side flange of the rim is first displaced when the rim with the tire thereon is, as shown in Figure 2, fitted over the annulus 10 of the stand to engage the unobstructed edge of the rim with the flange 12 of the annulus, the valve casing 32 being received through the notch 11 in the annulus. The stand will then support the rim and tire in convenient position. Accordingly, the lever 19 may be rocked to swing the upper end thereof forwardly and engage the barrel 22 of the ejector with the cap 34 of the valve casing 32, the plunger 27 being, of course, retracted and the cap projecting into the outer end portion of the barrel. The annulus is of a diameter to receive the average truck tire rim and by adjusting the lever 19 vertically, as previously explained, the barrel may be positioned to properly coact with the valve casings of different sized tires. As will be appreciated, variation in the transverse diameter of different tires and corresponding variation in the width of the rims therefor will produce variance in the elevation of the valve casings with respect to the annulus. After having thus engaged the barrel 22 with the valve casing cap 34, the rocking movement of the lever 19 may be continued, as shown in Figure 3, for ejecting the valve casing from within the opening 33 of the rim and pushing the valve casing inwardly within the tire, the barrel of the ejector being of a size to be freely received through the valve opening of the rim. As will be seen, inward displacement of the valve casing may thus be readily accomplished and, of course, in order to prevent the valve casing from following the ejector barrel back out through the opening 33 of the rim when the ejector is retracted, it becomes necessary to disengage the cap of the valve casing from the ejector barrel and dislocate the casing with respect to the opening 33. The bell crank 26 is then, as shown in Figure 4, depressed for shifting the plunger 27 forwardly and projecting the tip 28 thereof at the forward end of the barrel. As will be appreciated, forward movement of the plunger will serve to push the cap inwardly out of the forward end portion of the barrel and due to the presence of the rounded tip 28 upon the plunger, the cap will, under the yieldable influence of the inner tube, ride off of the plunger and engage against a side of the tire casing. The valve casing will thus be caused to lodge within the tire so that the plunger may be retracted and the lever 19 released when said lever will, as shown in Figure 5, return to its normal position and retract the ejector barrel. As shown in this figure, the tire may then be pushed downwardly from around the rim and easily disengaged therefrom. I accordingly provide a device wherein stiff and heavy pneumatic truck tires may be readily removed from the rims thereof.

Having thus described the invention, what is claimed as new is:

1. A device of the character described including means for supporting a demounted wheel rim, and means for ejecting the valve casing of a tire through the rim.

2. A device of the character described including means for supporting a demounted wheel rim, means for ejecting the valve casing of a tire through the rim into the tire, and means for disengaging the free end portion of the casing from the first means.

3. A device of the character described including means for supporting a demounted wheel rim, means for ejecting the valve casing of a tire through the rim into the tire, and means for disengaging the casing from the first means and comprising means whereby the casing will ride out of engagement therewith.

4. A device of the character described including means for supporting a demounted wheel rim, and an ejector operable for shifting the valve casing of a tire outwardly through the rim into the tire and comprising means for disengaging the casing from the ejector.

5. A device of the character described including means for supporting a demounted wheel rim, and an ejector operable for shifting the valve casing of a tire outwardly through the rim into the tire and comprising a plunger for disengaging the casing from the ejector.

6. A device of the character described including means for supporting a demounted wheel rim, and an ejector operable for shifting the valve casing of a tire outwardly through the rim into the tire and comprising means for disengaging the casing from the ejector, the latter means being formed with a working face whereby the free end portion of the casing will ride thereover laterally within the tire.

7. A device of the character described including means for supporting a demounted rim, and means carried by the first means for ejecting a tire valve casing outwardly through a rim upon the first means.

8. A device of the character described including an annulus for supporting a demounted rim, and means carried by said annulus for ejecting a tire valve casing outwardly through a rim upon the annulus.

9. A device of the character described including a stand for supporting a demounted rim, and means carried by the stand for ejecting a tire valve casing outwardly through a rim upon the stand.

10. A device of the character described including an annulus for supporting a demounted rim, and an ejector carried thereby and operable for shifting a tire valve casing outwardly through a rim upon the annulus and freeing the casing.

11. A device of the character described including a stand for supporting a demounted rim, and means carried thereby and operable for shifting a tire valve casing outwardly through a rim upon the stand and freeing the casing.

12. A device of the character described including rim supporting means, a pivoted lever carried thereby, an ejector barrel mounted upon the lever and movable thereby outwardly beyond said means, and a plunger shiftable within the barrel.

13. A device of the character described including rim supporting means, a pivoted lever carried thereby, an ejector barrel pivoted upon said lever and movable thereby outwardly beyond said means, a plunger shiftable within the barrel, and a lever pivoted upon the barrel and connected to the plunger for shifting the plunger.

14. A device of the character described including rim supporting means, a pivoted lever carried thereby, an ejector barrel mounted upon the lever and movable thereby outwardly beyond said means, and a plunger shiftable within the barrel, the plunger being provided with a rounded tip projectable at the outer end of the barrel.

15. A device of the character described including an annulus provided with an opening, a bracket secured to the annulus near said opening, a lever pivoted upon the bracket, an ejector barrel pivoted upon said lever and movable thereby through the opening, a plunger shiftable within the barrel to project at the outer end thereof and provided with a rounded tip, the barrel being formed with upstanding lugs, and a bell crank pivoted upon said lugs and connected to the plunger for shifting the plunger.

In testimony whereof I affix my signature.

GUY C. BROWN. [L. S.]